United States Patent
Spare et al.

(10) Patent No.: US 7,636,053 B2
(45) Date of Patent: Dec. 22, 2009

(54) ARTICLE AND METHOD FOR MONITORING TEMPERATURE AND PRESSURE WITHIN A PRESSURIZED GAS CYLINDER

(75) Inventors: Bradley Landon Spare, Oceanside, CA (US); Justin David Ward, Aliso Viejo, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 373 days.

(21) Appl. No.: 11/533,680

(22) Filed: Sep. 20, 2006

(65) Prior Publication Data

US 2008/0079606 A1    Apr. 3, 2008

(51) Int. Cl.
*H04Q 9/00*     (2006.01)

(52) U.S. Cl. .............. 340/870.07; 702/130; 702/138; 702/140; 73/718; 141/94

(58) Field of Classification Search ........ 340/539.1, 340/870.01, 870.08, 870.13, 603, 612; 73/718; 141/94; 702/130, 138, 140
See application file for complete search history.

(56) References Cited

U.S. PATENT DOCUMENTS

| | | |
|---|---|---|
| 629,092 A | 7/1899 | Ross |
| 3,367,623 A | 2/1968 | Piel |
| 3,867,274 A | 2/1975 | Herman |
| 4,025,912 A | 5/1977 | Rice |
| 4,194,177 A | 3/1980 | Adamson |
| 4,596,266 A | 6/1986 | Kinghorn et al. |
| 4,942,383 A | 7/1990 | Lam et al. |
| 5,217,202 A | 6/1993 | Phillips |
| 5,317,924 A | 6/1994 | Maack |
| 5,319,964 A | 6/1994 | Stephenson et al. |
| 5,438,877 A | 8/1995 | Vowles et al. |
| 5,572,445 A | 11/1996 | Shook et al. |
| 5,708,424 A | 1/1998 | Orlando et al. |
| 5,942,980 A * | 8/1999 | Hoben et al. ............. 340/618 |
| 6,065,335 A | 5/2000 | Denz et al. |
| 6,089,248 A | 7/2000 | Rost |
| 6,336,362 B1 | 1/2002 | Duenas |
| 6,367,500 B1 | 4/2002 | Kerger et al. |
| 6,553,336 B1 | 4/2003 | Johnson et al. |
| 6,700,503 B2 | 3/2004 | Masar et al. |
| 6,776,900 B2 * | 8/2004 | Mazurek et al. ........... 210/115 |
| 6,779,406 B1 | 8/2004 | Kuznia et al. |
| 6,822,565 B2 | 11/2004 | Thomas et al. |

(Continued)

FOREIGN PATENT DOCUMENTS

EP    0718607 B1    6/1996

(Continued)

*Primary Examiner*—Albert K Wong
(74) *Attorney, Agent, or Firm*—Gifford, Krass, Sprinkle, Anderson & Citkowski, P.C.

(57) ABSTRACT

A wireless based sensor assembly incorporated within a sealed and pressurized vessel including an end plug secured against an inner surface of the vessel. Temperature and pressure sensors are mounted to inner exposed locations of the end plug and are capable of monitoring temperature and a pressure conditions existing within the sealed vessel. A power supply is communicated to the sensors within said vessel and such that the sensors communicate, in wireless fashion, information regarding the conditions existing internally within the vessel to an external location.

8 Claims, 2 Drawing Sheets

U.S. PATENT DOCUMENTS

| | | |
|---|---|---|
| 6,922,144 B2 | 7/2005 | Bulin et al. |
| 7,024,936 B2 | 4/2006 | Pedersen et al. |
| 7,146,861 B1 * | 12/2006 | Cook et al. ............... 73/718 |
| 7,209,865 B2 * | 4/2007 | Scott et al. ............... 702/188 |
| 7,295,919 B2 * | 11/2007 | Humphrey ............... 701/202 |
| 7,314,069 B2 * | 1/2008 | Tanaka ............... 141/94 |

FOREIGN PATENT DOCUMENTS

| | | |
|---|---|---|
| EP | 1215471 A1 | 6/2002 |
| JP | 55154427 A | 12/1980 |
| JP | 2004-132383 | 4/2004 |

* cited by examiner

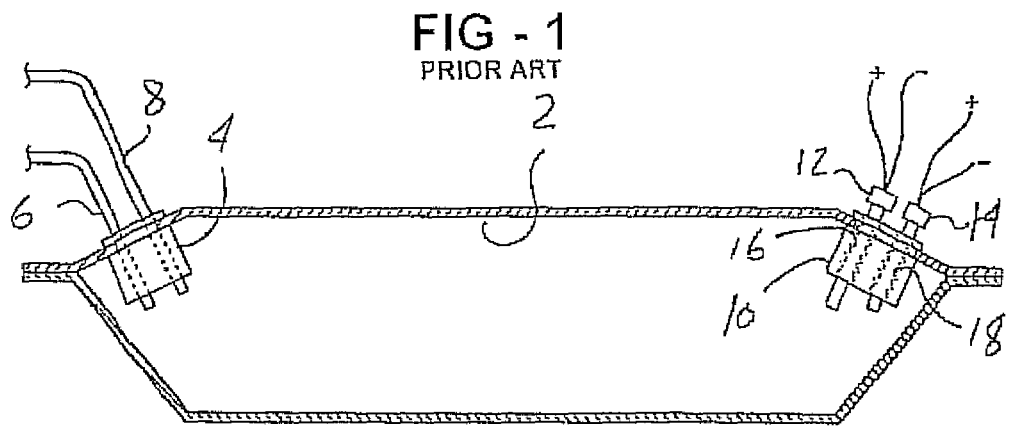
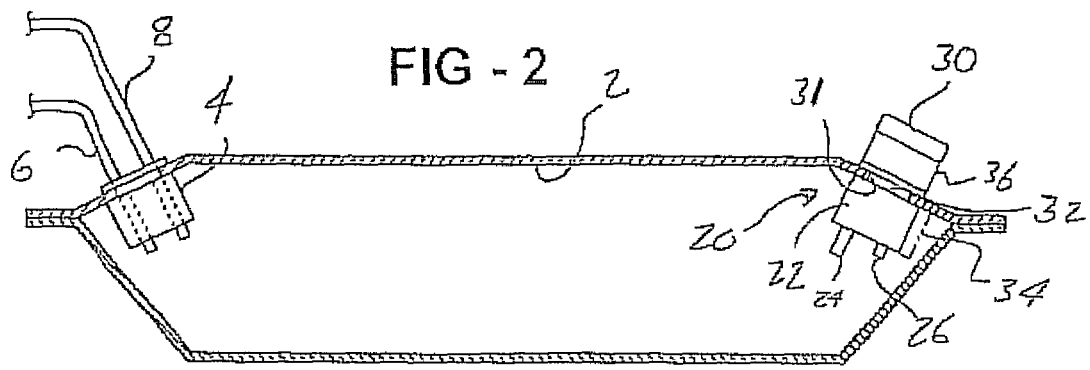
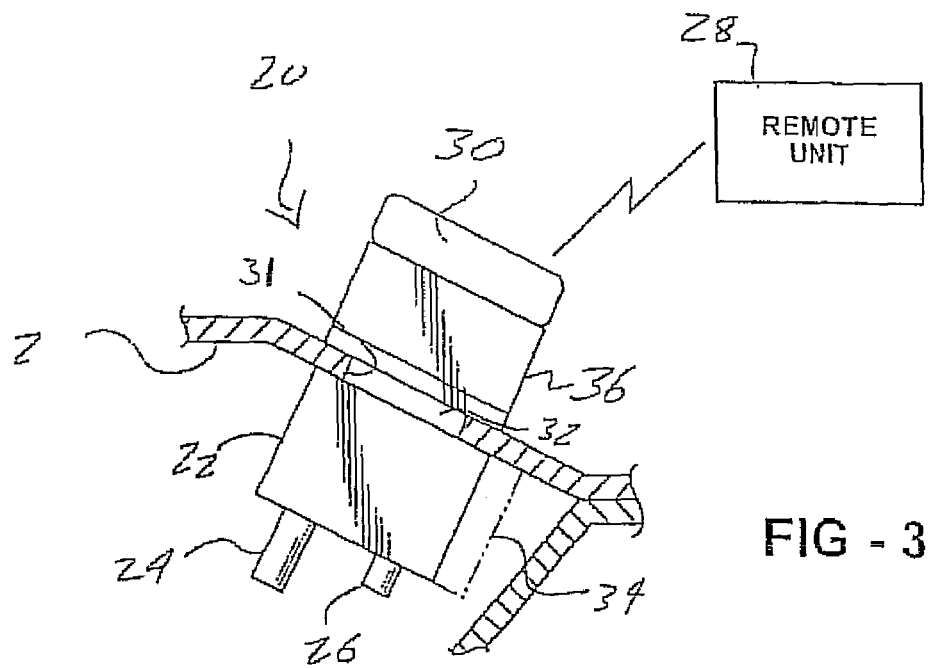

ARTICLE AND METHOD FOR MONITORING TEMPERATURE AND PRESSURE WITHIN A PRESSURIZED GAS CYLINDER

BACKGROUND OF THE INVENTION

1. Field of the Invention

The present invention relates generally to pressure and temperature monitoring within an enclosed high pressure environment. More specifically, the present invention teaches an article and associated method for wireless mounting of pressure and temperature sensors within a pressurized (e.g. hydrogen gas) cylinder, such as utilized in a vehicle fuel cell application.

2. Description of the Prior Art

The importance of being able to effectively monitor and control parameters such as temperature and pressure existing within a highly charged gas environment is evident. One such known application is the use of highly pressurized cylinders filled with hydrogen, as, and which are employed in vehicle fuel cell assemblies.

In one known application, referencing also the prior art illustration of FIG. 1, an enclosed tank (typically an enclosed vessel or cylinder) is referenced at 2 and such as which is filled with a pressurized gaseous fuel material, in one example with hydrogen. A first (typically metallic) end plug 4 is mounted to the tank 2 so that it communicates with an interior of the cylinder 2 at a first location and through which extends a First inlet conduit 6 and second outlet conduit 8 (e.g. inlet and exhaust pipes) for both filling and removing hydrogen gas from within the pressurized cylinder.

A second metallic end plug 10 is provided in communication with a further interior location of the tank 2 and for receiving in inserting therethrough a pair of temperature 12 and pressure 14 sensor assemblies. The sensors 12 and 14 are typically mounted via threaded holes, 16 and 18 respectively, formed through the end plug 10, and include trailing wiring associated with both power supply and feedback of sensor information to a remote processor unit (not shown).

In addition to safety considerations associated with the ability to gauge inner temperature and pressure levels, monitoring of the same also provides an effective means for determining fuel (hydrogen) levels existing within the tank. Given further the significant differential in both temperature and pressure levels existing between the tank 2 and the external environment, it has been found that gas can potentially leak from the tank 2 to the outside atmosphere, though either or both the threaded holes 16 and 18, and as a result of rupturing of the associated sensor body 12 or 14.

Another example of a prior art monitoring system is set forth in U.S. Pat. No. 6,700,503, issued to Masar et al., and which teaches monitoring conditions within a storage tank including a sensor communicating data indicative of conditions within the tank to a base controller and by which the data is decoded and arranged into a graphical display of the conditions in the storage tank. The display includes such as representation of the tank conditions, such as fluid levels and temperature. The base controller is connected to a communications network such that data indicative of conditions within the storage tank can be communicated to remote users through a wireless communication network by way of alphanumeric messages.

SUMMARY OF THE PRESENT INVENTIONS

A wireless based sensor assembly incorporated within a sealed and pressurized vessel, such as a tank, includes first and second end plugs mounted within inner locations of the vessel. Temperature and pressure sensors are mounted to inner exposed locations of a first end plug and are capable of monitoring temperature and a pressure conditions existing within the sealed vessel. Inlet and outlet conduits, such as pipes associated with a hydrogen filled fuel cell tank, communicate to the vessel interior via the second end plug. A power supply is communicated to the sensors within said vessel and such that the sensors communicate, in wireless fashion, information regarding temperature, pressure and fuel level conditions within the vessel.

BRIEF DESCRIPTION OF THE DRAWINGS

Reference will now be made to the attached drawings, when read in combination with the following detailed description, wherein like reference numerals refer to like parts throughout the several views, and in which:

FIG. 1 illustrates in cutaway a pressure filled tank according to the prior art and which shows a pair of wire based sensors installed through threaded apertures associated with a metallic end plug;

FIG. 2 is an illustration of one possible variant of a wireless sensor arrangement according to the present inventions, and by which both pressure and temperature sensors are arranged upon internally projecting locations of the associated end plug;

FIG. 3 is an enlarged partial illustration of the sensor assembly shown in FIG. 2 and which shows the remote (wireless) transmitting capabilities associated with the present inventions, as well as some possible and nonlimiting options for powering the hermetically located sensors, e.g. through internally built-in battery or inductive power supply;

DETAILED DESCRIPTION OF THE PREFERRED EMBODIMENTS

Figure 4:
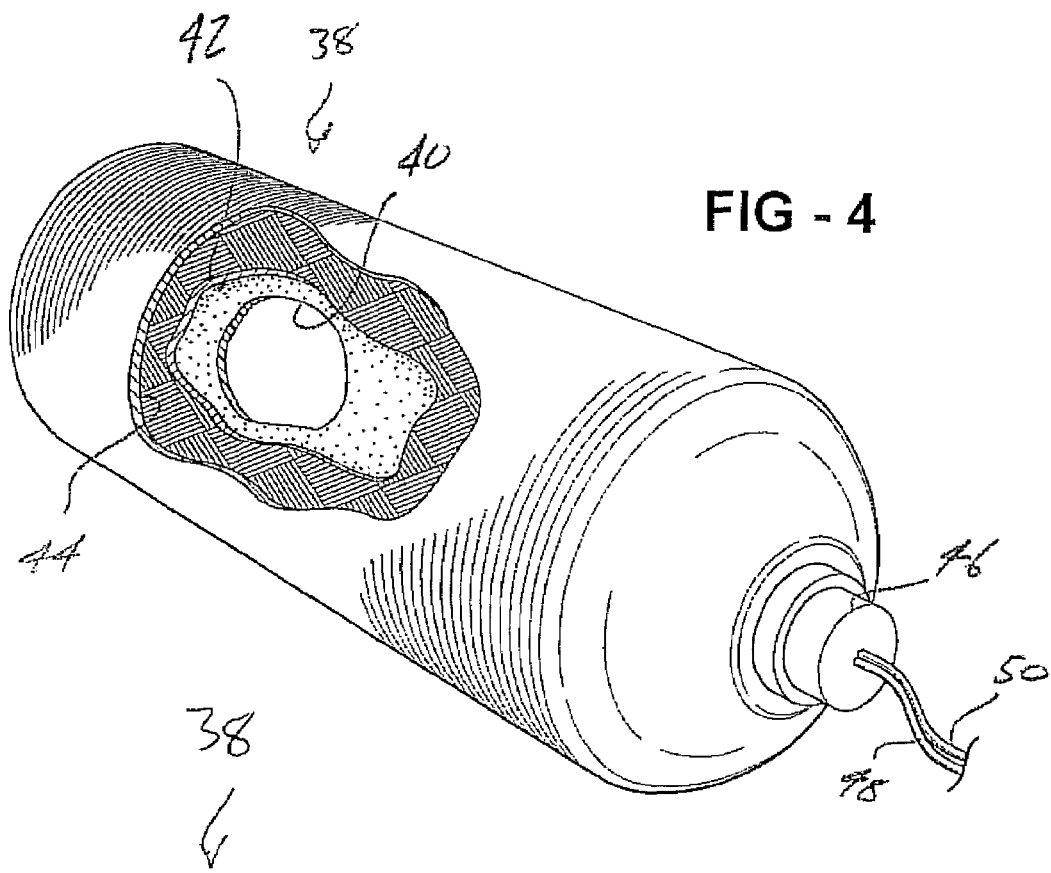
FIG. 4 is a perspective view, in partial cutaway, and illustrating the multi-layered construction associated with a high pressure, e.g. hydrogen, tank construction such as adapted for use with the wireless interior mounted temperature and pressure sensors according to the present inventions.

Referring now to FIG. 2, an illustration is shown generally at 20 of a wireless based sensor assembly incorporated into an enclosed tank 2 according to the present inventions. The present inventions contemplate the ability to provide wireless transmission of data relevant to information not limited to temperature, pressure (and thereby deduced internal fuel levels) associated with such as a vehicle fuel cell assembly. The inventions, as will be further described, further contemplate a wireless sensor subassembly in use with an existing pressurized vessel, a combination pressurized vessel incorporating such a wireless sensor assembly, as well as a method for installing such a sensor for remote monitoring of internal conditions within the pressurized vessel.

The present inventions are further understood not to be limited to fuel cell applications, but may also contemplate any other application in which it is desired to provide remote or wireless transmission of sensor gathered data from a sealed and internal location associated with a pressurized vessel. This again without the prior art shortcoming of requiring through apertures (see again at 16 and IS in FIG. 1) for mounting wire based sensors, e.g. again at 12 and 14, respectively.

Referring again to FIG. 2, the assembly 20 includes an end plug 22 (typically metallic) mounted within the tank 2 at a location consistent with the prior art end plug illustrated at 10 in FIG. 1. A number of the identical features described in the prior art illustration of FIG. 1 are repeated herein without additional explanation, these including the first end plug 4 communicating the inlet 6 and exhaust 8 lines to and from the pressurized tank interior.

A pair of wireless sensors are illustrated and correspond to a first temperature sensor 24 and a second pressure sensor 26. The sensors 24 and 26 compare to the sensors 12 and 14 illustrated and described in the prior art representation of FIG. 1, except that they do not require through holes (e.g. such as threaded holes previously illustrated at 16 and 18) through which pass the connected wires necessary for communicating the information with an exterior location from the pressurized tank 2.

Rather, the wireless capabilities built into the sensors 24 and 26 (such being known in the relevant art and not requiring additional explanation herein) are such that information transmitted is received by a remote unit, see at 28, this in one possible variant being associated with processor driven capabilities associated with a vehicle fuel cell assembly. Reference is further made to an external portion 30 of the secondary end plug 22 and which may generally illustrate a wireless transmitting component of the sensors 24 and 26.

Accordingly, the sensors 24 and 26 are secured to the end plug 22 in such a fashion so as not to otherwise compromise the sealed integrity of the pressurized environment existing within the tank 2 (and by virtue of not requiring the wire communicating apertures extending through the end plus body which may fail and result in gas leakage therethrough). Reference is further made to inwardly facing annular edge 30 defined in the tank and to through which an intermediate body portion 32 of the end plug 22 is secured in sealed fashion.

A power supply is communicated to the sensors 24 and 26, and in one illustrated possibility includes a lifetime battery, such as a watch type lithium or other portable battery 34 secured internally within the pressurized tank 2, and such as directly to a surface location of the end plug 22 in proximate and communicating fashion with the sensors. Although not shown, it is contemplated that internal wires (not shown and in any event not extending through the body of the end plug 22 to any location exterior of the pressurized tank 2) may be provided for communicating power from the battery 34 to the sensors 24 and 26. In another nonlimiting and possible variant, an external electrical power source (such as which may be communicated to exterior body portion 36 of the end plug as shown in FIG. 3) is communicated to the sensors 24 and 26, via inductance through the metallic body of the end plug and to its inner located portion 22.

Referring now to FIG. 4 a perspective view, in partial cutaway, is illustrated at 38, of a multi-layered construction associated with a high pressure, typically hydrogen, tank construction and such as adapted for use with the wireless interior mounted temperature and pressure sensors according to the present inventions. Specifically, the tank construction 38 includes, according to one non-limiting embodiment, an inner-most plastic liner 40, an intermediate helical pattern layer 42 (this further including such as a wound graphite, filament, carbon or other suitable material which provides a durable/flexible structural aspect to the tank wall construction). An outermost hoop (e.g. steel) layer 44 is banded about the intermediate helical pattern layer 42 and, in cooperation with the inner most plastic liner, 40, provides the tank 38 with the requisite strength and durability necessary to maintain its structural integrity, while being pressurized by the selected gas (in one instance being hydrogen as is known to be utilized in such as fuel cell applications). An end plug 46 is also illustrated and from which extend wires 48 and 50 associated with such as (input) power and (output) data, respectively.

Figure 5:
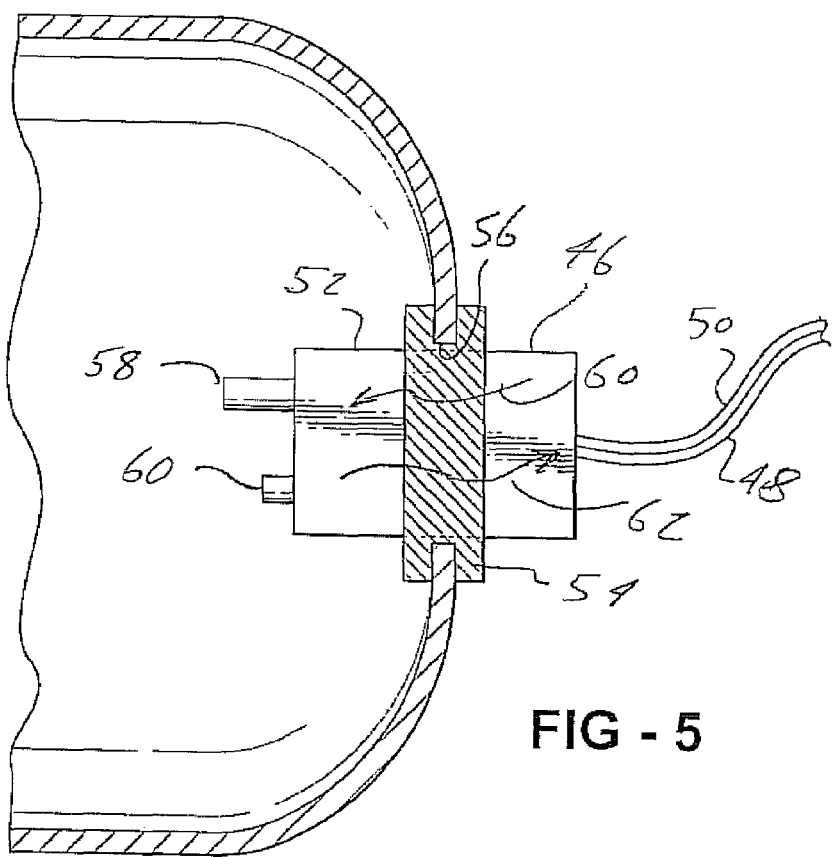
FIG. 5 is a side cutaway view of a variant of an end plug assembly providing both inductive power supply as well as inductive and reverse direction date transfer both to and from the interiorly mounted temperature and pressure sensors according to the present invention.

Referring finally to FIG. 5, a side cutaway view is illustrated of an end plug assembly, such as previously referenced at 46 and associated with a selected end location of the tank 38 in FIG. 4. The outer projecting portion (or unit) of the end plug 46 communicates with an interior disposed portion (or communicating unit) 52 located within the tank, again generally represented at 38 and intended to incorporate any suitable wall construction not limited to that described in FIG. 4. An intermediate integral portion 54 is disposed between the outer 46 and inner 52 units associated with the end plug, this typically likewise being a steel or other durable and conductive portion of suitable strength for covering the aperture defined in the end of the tank (see inner annular edge 56 and about which the intermediate portion 54 of the end plug boss seats).

A pair of wireless mounted sensors 58 and 60 corresponding to temperature and pressure sensors, respectively, are secured to the in-tank unit 52 in a fashion consistent with that previously described. As described previously, the sensors 58 and 60 communicate by induction, see arrow 60 extending through the intermediate portion 54, in a first direction to convey electrical power, such as originating from the power supply wire 48, to the interior of the tank. Output data, as referenced generally by reverse directional arrow 62, flows likewise by induction from the conductive locations associated with the sensors 58 and 60, such that the return data line 50 receives the information being conducted for subsequent transmission to a processor unit or the like communicating at a remote extending end of the wire 50. It is further contemplated that the inductive supplied power and output data can be calibrated, such as according to different wavelengths or the like, and in order to avoid them interfering with one another.

A corresponding method remote monitoring of at least one condition existing within a sealed and pressurized environment is provided according to the present article description and includes the steps of securing at least one sensor to a location within the internally pressurized environment, powering the sensor within the environment, and transmitting, in wireless fashion from the sensor to an external location of the environment, information regarding the internal condition of the sealed and pressurized environment. Additional method steps include mounting an end plug within the pressurized environment and upon which is disposed at least one of a temperature and pressure sensor, as well as powering the sensor from either a likewise built-in lifetime battery or through inductive communicated power supplied through the end plug.

Having described out invention, other and additional preferred embodiments will become apparent to those skilled in the art to which it pertains, and without deviating from the scope of the appended claims.

The invention claimed is:

1. An assembly for remote monitoring of at least one condition existing within a said tank, having an inner wall defining an interior compartment, said interior compartment being sealed and containing a pressurized gas, said wall having a peripheral portion defining an aperture, said assembly comprising:

a sensor incorporated into a housing which also includes an end plug with a peripheral edge having a predetermined outer dimension, said end plug securing within said tank such that said peripheral edge overlaps said aperture and contacts said inner wall of said tank to prevent removal of said plug from said interior compartment and to prevent compressed gas from escaping the tank interior;

a power supply communicated to said sensor within said sealed environment; and a transmitter incorporated into said sensor communicating, in wireless fashion, through said end plug to an exterior located receiver, information regarding the internal condition of the sealed and pressurized environment.

2. The assembly as described in claim 1, said at least one sensor having a specified shape and size and farther comprising a first temperature sensor and a second pressure sensor.

3. The assembly as described in claim 1, said power supply further comprising a lifetime battery built into the tank interior.

4. The assembly as described in claim 1, further comprising at least one of an inductive power supply communicated to said sensor from an exterior location of said tank and an inductive data transfer communicated from said sensor to said tank exterior through said end plug.

5. The assembly as described in claim 1, said sensor having a specified shape and size, the tank and associated end plug further exhibiting a specified shape and size and being constructed of a metal.

6. The assembly as described in claim 1, said sensor having a specified shape and size, a first inlet line and a second outlet line communicating with further locations associated with the tank.

7. The assembly as described in claim 1, said sensor having a specified shape and size and being utilized within a vehicle fuel cell application.

8. The assembly as described in claim 1, said sensor having a specified shape and size, the compressed gas within the tank further including at least a hydrogen gas.

\* \* \* \* \*

UNITED STATES PATENT AND TRADEMARK OFFICE
CERTIFICATE OF CORRECTION

PATENT NO. : 7,636,053 B2
APPLICATION NO. : 11/533680
DATED : December 22, 2009
INVENTOR(S) : Spare et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 466 days.

Signed and Sealed this

Ninth Day of November, 2010

David J. Kappos
*Director of the United States Patent and Trademark Office*